US011082357B2

(12) United States Patent
Wang

(10) Patent No.: US 11,082,357 B2
(45) Date of Patent: *Aug. 3, 2021

(54) FACILITATING DYNAMIC HIERARCHICAL MANAGEMENT OF QUEUE RESOURCES IN AN ON-DEMAND SERVICES ENVIRONMENT

(71) Applicant: salesforce.com, inc., San Francisco, CA (US)

(72) Inventor: Xiaodan Wang, Dublin, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,976

(22) Filed: Nov. 25, 2019

(65) Prior Publication Data

US 2020/0236060 A1 Jul. 23, 2020

Related U.S. Application Data

(63) Continuation of application No. 14/526,159, filed on Oct. 28, 2014, now Pat. No. 10,491,537.

(51) Int. Cl.
*H04L 12/911* (2013.01)
*H04L 12/863* (2013.01)
*G06F 9/54* (2006.01)
*G06F 9/50* (2006.01)

(52) U.S. Cl.
CPC ............ *H04L 47/72* (2013.01); *G06F 9/5027* (2013.01); *G06F 9/546* (2013.01); *H04L 47/50* (2013.01); *G06F 2209/5018* (2013.01)

(58) Field of Classification Search
CPC ....... H04L 47/72; H04L 47/50; H04L 12/911; H04L 12/863; H04L 43/04; H04L 12/26;
(Continued)

(56) References Cited

U.S. PATENT DOCUMENTS 5,577,188 A 11/1996 Zhu
5,608,872 A 3/1997 Schwartz et al.
(Continued)

OTHER PUBLICATIONS

Final Office Action for U.S. Appl. No. 14/526,159 dated Oct. 4, 2017, 18 pages.
(Continued)

Primary Examiner — Tonia L Dollinger
Assistant Examiner — Mehulkumar J Shah
(74) Attorney, Agent, or Firm — Jaffery Watson Mendonsa & Hamilton LLP

(57) ABSTRACT

In accordance with embodiments, there are provided mechanisms and methods for facilitating dynamic hierarchical management of queue resources in an on-demand services environment in a multi-tenant environment according to one embodiment. In one embodiment and by way of example, a method includes assigning, in runtime, by the database system, weights to at least one of a plurality of tenants and a plurality of message types. The assigned weights are capable of being dynamically scaled, in runtime, based on one or more factors. The method may further include allocating, in runtime, by the database system, resources to one or more of the plurality of tenants and one or more of the plurality of message types based on their assigned one or more weights of the weights. The allocated resources are capable of being dynamically modified, in runtime, based on scaling of the assigned weights.

12 Claims, 8 Drawing Sheets

(58) Field of Classification Search
CPC .............. G06F 9/5027; G06F 9/546; G06F 2209/5018; G06F 9/54; G06F 9/50; G06F 17/3053; G06F 17/30
USPC .............. 709/226, 223; 340/16.1; 710/36; 711/150
See application file for complete search history.

(56) References Cited

U.S. PATENT DOCUMENTS

| | | | |
|---|---|---|---|
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,003,475 B1* | 2/2006 | Friedland ............... G06Q 10/06 705/7.13 | |
| 7,072,932 B1* | 7/2006 | Stahl ................... H04L 67/2823 709/203 | |
| 7,289,976 B2 | 10/2007 | Kihneman et al. | |
| 7,340,411 B2 | 3/2008 | Cook | |
| 7,620,655 B2 | 11/2009 | Larsson et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0131063 A1 | 7/2003 | Breck | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0280119 A1 | 12/2006 | Karamanolis et al. | |
| 2007/0011330 A1 | 1/2007 | Dinker et al. | |
| 2009/0177744 A1 | 7/2009 | Marlow et al. | |
| 2011/0231848 A1* | 9/2011 | Long ...................... G06F 16/21 718/101 | |
| 2011/0258275 A1* | 10/2011 | Rao ........................ H04L 51/32 709/206 | |
| 2011/0295999 A1* | 12/2011 | Ferris .................... G06F 9/5072 709/224 | |
| 2012/0223951 A1* | 9/2012 | Dunn ...................... G06Q 10/10 345/467 | |
| 2012/0331016 A1 | 12/2012 | Janson et al. | |
| 2013/0337789 A1* | 12/2013 | Johnson ............. H04W 40/244 455/414.1 | |

OTHER PUBLICATIONS

Non-Final Office Action for U.S. Appl. No. 14/526,159 dated Dec. 26, 2018, 22 pages.

Non-Final Office Action for U.S. Appl. No. 14/526,159 dated Mar. 23, 2017, 17 pages.

(56) References Cited

OTHER PUBLICATIONS

Notice of Allowance for U.S. Appl. No. 14/526,159 dated Sep. 12, 2019, 19 pages.

* cited by examiner

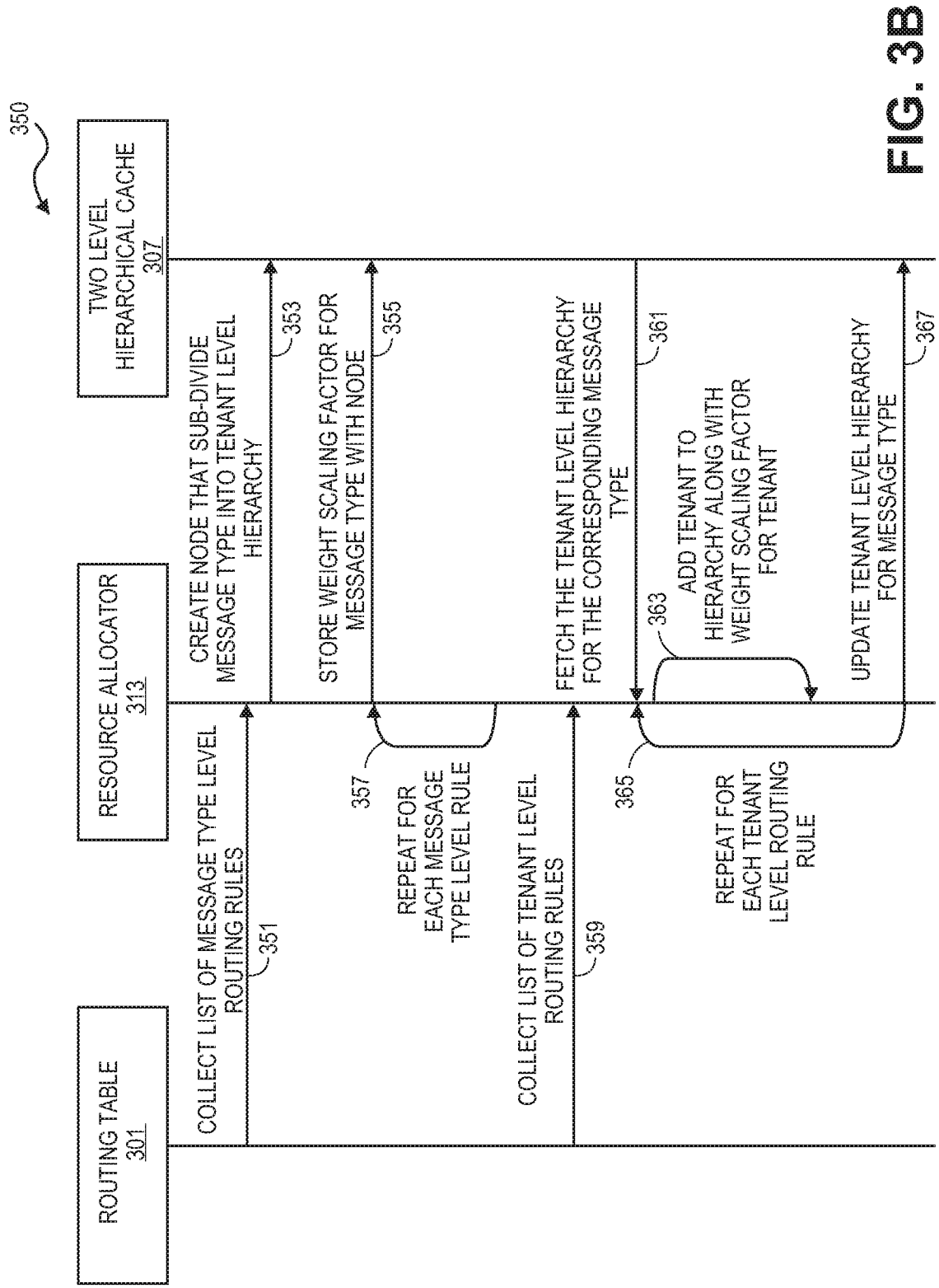

FACILITATING DYNAMIC HIERARCHICAL MANAGEMENT OF QUEUE RESOURCES IN AN ON-DEMAND SERVICES ENVIRONMENT

CLAIM OF PRIORITY

This application is a continuation of U.S. patent application Ser. No. 14/526,159, entitled "FACILITATING DYNAMIC HIERARCHICAL MANAGEMENT OF QUEUE RESOURCES IN AN ON-DEMAND SERVICES ENVIRONMENT," filed Oct. 28, 2014, now U.S. Pat. No. 10,491,537 with an issue date of Nov. 26, 2019, the contents of which are incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to facilitating dynamic hierarchical management of queue resources in an on-demand services environment.

BACKGROUND

Conventional message queuing techniques provide for a static allocation of queue resources without taking into consideration size or importance of organizations and message types. This often leads to undesirable allocation and consumption of queue resources that do not align with the requirements (such as revenue objectives) of the business.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

FIG. 3B illustrates a transaction sequence for constructing a multi-level (e.g., two-level) hierarchy for dynamic hierarchical management of queue resources according to one embodiment;

SUMMARY

Figure 1:
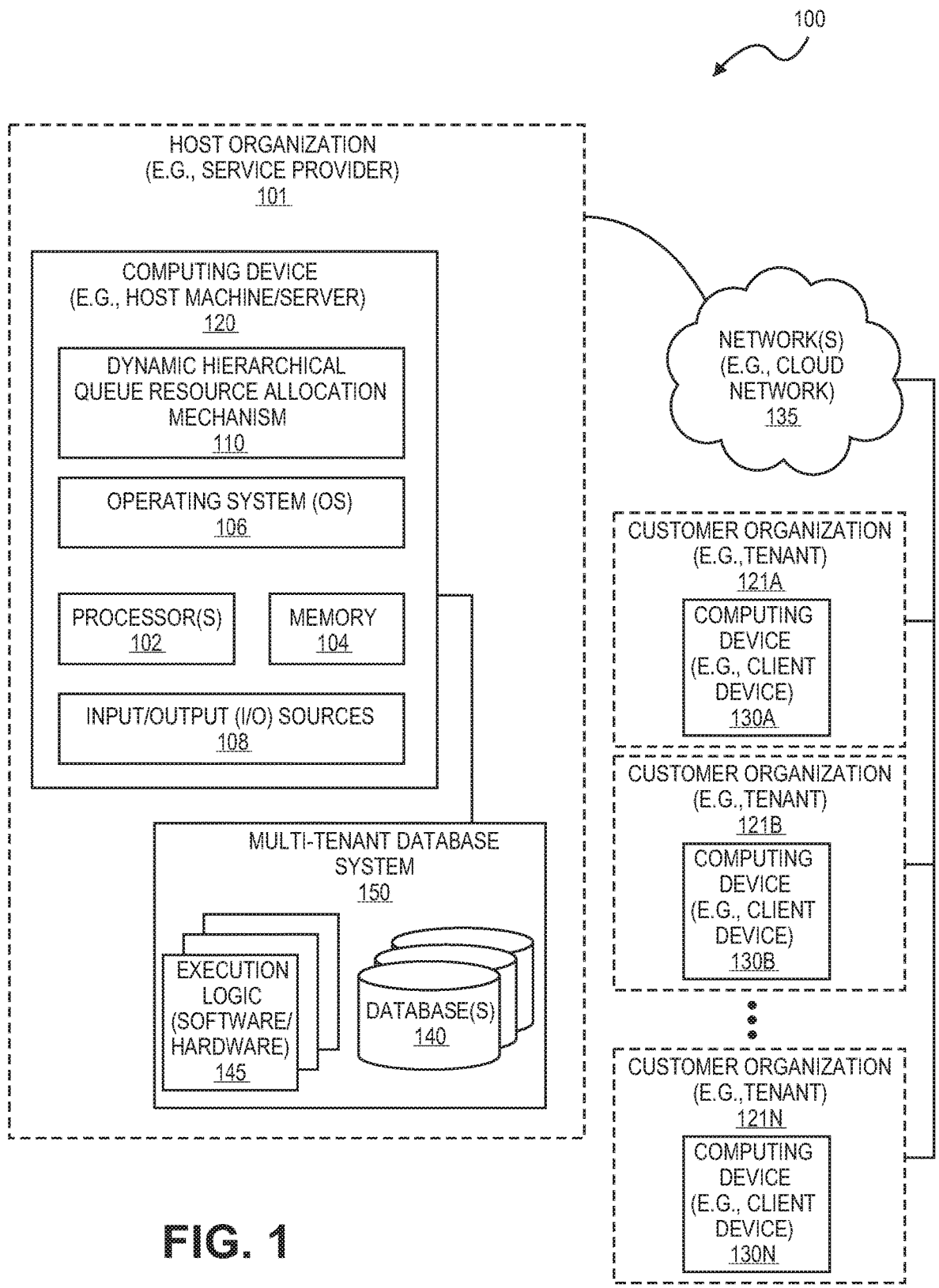
FIG. 1 illustrates a system having a computing device employing a dynamic hierarchical queue resource allocation mechanism according to one embodiment.

In accordance with embodiments, there are provided mechanisms and methods for facilitating dynamic hierarchical management of queue resources in an on-demand services environment in a multi-tenant environment according to one embodiment. In one embodiment and by way of example, a method includes assigning, in runtime, by the database system, weights to at least one of a plurality of tenants and a plurality of message types. The assigned weights are capable of being dynamically scaled, in runtime, based on one or more factors. The method may further include allocating, in runtime, by the database system, resources to one or more of the plurality of tenants and one or more of the plurality of message types based on their assigned one or more weights of the weights. The allocated resources are capable of being dynamically modified, in runtime, based on scaling of the assigned weights.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

Methods and systems are provided for facilitating dynamic hierarchical management of queue resources in an on-demand services environment in a multi-tenant environment according to one embodiment.

Embodiments provide for facilitating dynamic hierarchical management of queue resources in a multi-tenant environment. It is contemplated that most large-scale multi-tenant queuing systems are capable of servicing tens of thousands of tenants and hundreds of millions of messages on a daily-basis and accordingly, any unfair allocation of resources, as caused by conventional techniques, can be on a massive scale which can adversely impact implicit performance guarantees provided by the system.

Embodiments provide for a queue scheduling framework for balancing resource allocation and utilization among competing tenants, message types, and a combination thereof. Embodiments provide for a hierarchical formation of message in managing queue resources such that the queue resources are allocated and utilized based on a hierarchy of multiple dimensions, such as tenants and message types. This way, resources are allocated proportionally to each tenant and each message type by considering any number of factors, such as size, importance, etc., relating to the tenants and message types.

It is contemplated that embodiments and their implementations are not merely limited to multi-tenant database system ("MTDBS") and can be used in other environment, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a system 100 having a computing device 120 employing a dynamic hierarchical queue resource allocation mechanism ("hierarchical mechanism") 110 according to one embodiment. In one embodiment, computing device 120 includes a host server computer serving a host machine for employing dynamic hierarchical queue resource allocation mechanism ("hierarchical mechanism") 110 for facilitating elastic allocation of message queue resources to tenants in a multi-tiered, multi-tenant, on-demand services environment.

It is to be noted that terms like "queue message", "job", "query", "request" or simply "message" may be referenced interchangeably and similarly, terms like "job types", "message types", "query type", and "request type" may be referenced interchangeably throughout this document. It is to be further noted that messages may be associated with one or more message types which may relate to or be associated with one or more customer organizations, such as customer organizations 121A-121N, where, as aforementioned, throughout this document, "customer organizations" may be referred to as "tenants", "customers", or simply "organizations". An organization, for example, may include or refer to (without limitation) a business (e.g., small business, big business, etc.), a company, a corporation, a non-profit entity, an institution (e.g., educational institution), an agency (e.g., government agency), etc., etc., serving as a customer or client of host organization 101 (also referred to as "service provider" or simply "host") (e.g., Salesforce®) serving as a host of hierarchical mechanism 110.

Similarly, the term "user" may refer to a system user, such as (without limitation) a software/application developer, a system administrator, a database administrator, an information technology professional, a program manager, product manager, etc. The term "user" may further refer to an end-user, such as (without limitation) one or more of customer organizations 121A-N and/or their representatives (e.g., individuals or groups working on behalf of one or more of customer organizations 121A-N), such as a salesperson, a sales manager, a product manager, an accountant, a director, an owner, a president, a system administrator, a computer programmer, an information technology ("IT") representative, etc.

Computing device 100 may include (without limitation) server computers (e.g., cloud server computers, etc.), desktop computers, cluster-based computers, set-top boxes (e.g., Internet-based cable television set-top boxes, etc.), etc. Computing device 100 includes an operating system ("OS") 106 serving as an interface between one or more hardware/physical resources of computing device 100 and one or more client devices 130A-130N, etc. Computing device 100 further includes processor(s) 102, memory 104, input/output ("I/O") sources 108, such as touchscreens, touch panels, touch pads, virtual or regular keyboards, virtual or regular mice, etc.

In one embodiment, host organization 101 may further employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated multi-tenant database system 150 includes database(s) 140 to store (without limitation) information, relational tables, datasets, and underlying database records having tenant and user data therein on behalf of customer organizations 121A-N (e.g., tenants of multi-tenant database system 150 or their affiliated users). In alternative embodiments, a client-server computing architecture may be utilized in place of multi-tenant database system 150, or alternatively, a computing grid, or a pool of work servers, or some combination of hosted computing architectures may be utilized to carry out the computational workload and processing that is expected of host organization 101.

The illustrated multi-tenant database system 150 is shown to include one or more of underlying hardware, software, and logic elements 145 that implement, for example, database functionality and a code execution environment within host organization 101. In accordance with one embodiment, multi-tenant database system 150 further implements databases 140 to service database queries and other data interactions with the databases 140. In one embodiment, hardware, software, and logic elements 145 of multi-tenant database system 130 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against multi-tenant database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101 and its multi-tenant database system 150. For example, incoming requests received at the web server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the web-server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQuery™, Developerforce™, Visualforce™, Service Cloud Console Integration Toolkit™ ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

Figure 2:
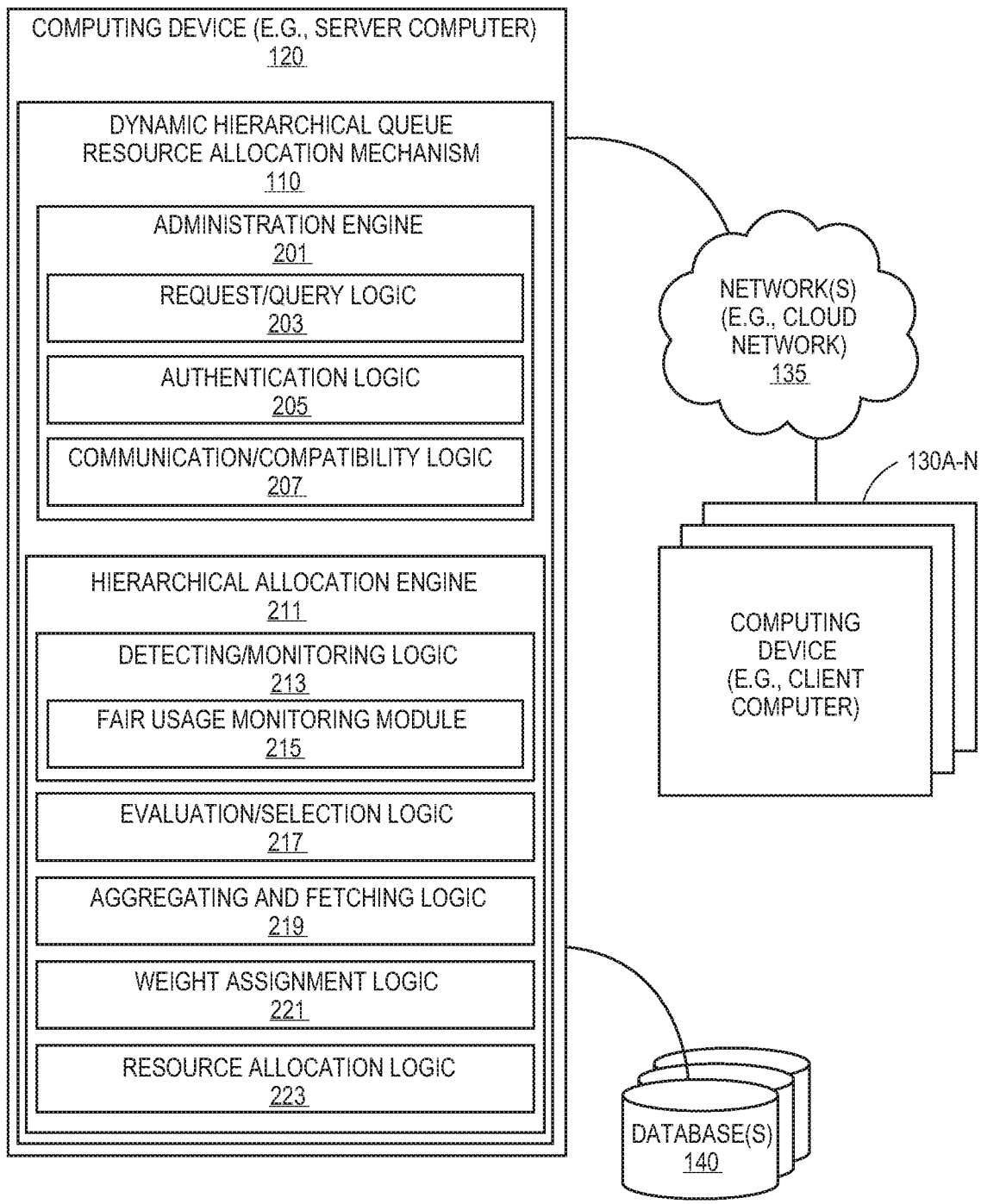
FIG. 2 illustrates a dynamic hierarchical queue resource allocation mechanism 110 according to one embodiment.

FIG. 2 illustrates a dynamic hierarchical queue resource allocation mechanism 110 according to one embodiment. In one embodiment, hierarchical mechanism 110 may include a number of components, such as (without limitation and not necessarily in this order): administration engine 201 and hierarchical allocation engine ("allocation engine") 211. In one embodiment, administration engine may include a number of components, such as (without limitation and not necessarily in this order) request/query logic 203, authentication logic 205, and communication/compatibility logic 207. Similarly, in one embodiment, allocation engine 211 may include a number of components, such as (without limitation and not necessarily in this order): detecting/monitoring logic ("detecting logic") 213 including fair usage monitoring module ("fair usage module") 215; evaluation/selection logic 217; aggregating and fetching logic 219; weight assignment logic ("weight logic") 221; and resource allocation logic ("resource logic") 223.

Throughout this document, terms like "framework", "mechanism", "engine", "logic", "component", "module", "tool", and "builder" may be referenced interchangeably and include, by way of example, software, hardware, and/or any combination of software and hardware, such as firmware. Further, any use of a particular brand, word, or term, such as "hierarchical" or "hierarchy", "fair usage", "two-level" or "multi-level", "weight" or "adjusted weight", "queue", "allocation", "registry", etc., and/or any of their forms, such as "queuing", "allocating", "weighting", "registering", etc., should not be read to limit embodiments to software or devices that carry that label in products or in literature external to this document.

As aforementioned, with respect to FIG. 1, any number and type of requests and/or queries may be received at or submitted to request/query logic 203 for processing. For example, incoming requests may specify which services from computing device 120 are to be provided, such as query requests, search request, status requests, database transactions, graphical user interface requests and interactions, processing requests to retrieve, update, or store data, etc., on behalf of one or more client devices 130A-N, code execution requests, and so forth.

In one embodiment, computing device 120 may implement request/query logic 203 to serve as a request/query interface via a web server or as a stand-alone interface to receive requests packets or other requests from the client devices 130A-N. The request interface may further support the return of response packets or other replies and responses in an outgoing direction from computing device 120 to one or more client devices 130A-N.

Similarly, request/query logic 203 may serve as a query interface to provide additional functionalities to pass queries from, for example, a web service into the multi-tenant database system for execution against database(s) 140 and retrieval of customer data and stored records without the involvement of the multi-tenant database system or for processing search queries via the multi-tenant database system, as well as for the retrieval and processing of data maintained by other available data stores of the host organization's production environment. Further, authentication logic 205 may operate on behalf of the host organization, via computing device 120, to verify, authenticate, and authorize, user credentials associated with users attempting to gain access to the host organization via one or more client devices 130A-N.

In one embodiment, computing device 120 may include a server computer which may be further in communication with one or more databases or storage repositories, such as database(s) 140, which may be located locally or remotely over one or more networks, such as network(s) 235 (e.g., cloud network, Internet, proximity network, intranet, Internet of Things ("IoT"), Cloud of Things ("CoT"), etc.). Computing device 100 is further shown to be in communication with any number and type of other computing devices, such as client computing devices 130A-N, over one or more networks, such as network(s) 140.

As aforementioned, embodiments provide for a hierarchical structure via hierarchical mechanism 110 to facilitate a multi-level (e.g., two-level) hierarchy in a multi-tenant environment. It is contemplated that embodiments are not limited to any number of levels of hierarchy; however, for the sake of brevity, clarity, and ease of understanding, a hierarchy based on two-levels is discussed throughout this document. For example, at a top level of the two-level hierarchy, an amount of resources is determined and allocated to each message type. Within each message type, the allocated resources are further divided among competing tenants. However, as aforementioned, this two-level hierarchical framework may be extended into multiple levels if, for example, a tenant may want to further distinguish its messages into geographical regions, business functions, etc. In one embodiment, an amount of resources (e.g., application thread time) is determined to be distributed to each competing message type, tenant, or a combination thereof, by considering factors, such as size, importance, etc.

It is contemplated that in many multi-tenant environments, there is a fixed number of application server or thread resources that may be available to be allocated and thus, in one embodiment, using resource logic 223, this fixed pool of application servers or thread resources may be allocated across two levels, such as first, to competing message types and second, to competing tenant within or associated with a particular message type. In one embodiment, resource allocation may be performed in a hierarchical manner in that thread resources are first distributed at a coarse grained level among different message types and once each message type has received a distribution of resources, those resources may be further divided amount competing tenants from the same message type as facilitated by resource logic 223 of hierarchical allocation engine 211. As aforementioned, using hierarchical allocation engine 211, a fair division of resources is performed across competing tenants within a message type, while various resource assignments are taken into consideration based on any number of factors, such as business policy decisions that favor one message type or one tenant's message over other tenants' messages, etc.

For brevity, clarity, and ease of understanding, for example, suppose there is a fixed number of application servers with X hours of thread (compute) capacity to be offered on a daily-basis. Now, consider that a company has multiple departments (that are represented by different clouds) with engineers who wish to have a fair share of the X hours of the available thread capacity every day. In this case, assuming that sales cloud, service cloud, and reliability cloud all want a piece of this capacity and further assuming, each team is equally important, each cloud is allocated an X/3 hours of thread capacity. Let us assume, within each cloud, there are various teams; for example, the reliability cloud may include a core data services team, message queue team, and service protection team. Thus, thread capacity would have to be further divided with the reliability cloud to accommodate the needs of each team within that cloud. Assuming each team within the reliability cloud is equally important, each team may be allocated a share of X/9 hours of thread time.

This computation may get a bit complicated if, for example, one team, such as message queue team, is identified by the company as having a higher priority over other teams and thus it needs to be allocated more thread capacity than other teams (such as twice as much as other teams) under the reliability cloud. In this case, message queue team may receive X/6 (X/3*½) hours of thread capacity while the other two teams may receive X/12 hours each. To complete this analogy, for example, hierarchical mechanism 110 may allow for a two-level hierarchical allocation with departments or clouds denoting message types and teams within each cloud denoting tenants. It is contemplated that in practice, resources may be allocated at a finer time scale (e.g., minutes) and at the granularity of the number of application servers.

In one embodiment, detecting/monitoring logic 213 may be used to continuously, and in runtime, monitor the usage performance of any number and type of tenants and/or message types so that any over-consumption and/or under-consumption of the resources by one or more of the tenants and/or message types may be detected. In one embodiment, fair usage module 215 of detecting/monitoring logic 213 may be used to more specifically monitor those tenants and/or message types that may be nearing over-consumption or under-consumption of their allocated resources to ensure that fair usage is continuously maintained.

In one embodiment, the hierarchical framework provided by hierarchical mechanism 110 may offer a resource allocation scheme that is based on, for example, a weight scale to assign weights to each message type and each tenant based on any number of factors, such as overall importance, priority over their counterparts, etc., as facilitated by weight logic 221. For example, and in one embodiment, weight logic 221 may be used to judge each tenant and/or message type based on a weight scaling factor where the absolute value of the weight is not of matter and rather, it is the relative difference between the weights when compared with each other is of matter. For example, a first tenant that is assigned a weight of 2 and a second tenant is assigned a weight of 1 by weight logic 221, the first tenant (e.g., Coke®) may be regarded as twice as important as the first tenant and thus, for example, may be allocated 66% of the resources while the second tenant (e.g., Pepsi®) may be allocated 33% of the resources by resource allocation logic 223 and as recommended by fair usage module 215 to ensure fair usage of resources.

It is to be noted that Coke® received twice the share of Pepsi®'s thread resources. Now let us suppose there is a third tenant (e.g., Fanta®) submits its messages and Fanta® has a weight of 3. In this case, Fanta® may be recommended by fair usage module 215 to receive an appropriate amount of resources and accordingly, Fanta® is allocated, via resource allocation logic 223, three times as Pepsi® and 50% more than Coke®, such as Pepsi® at 16.7%, Coke® at 33.3%, and Fanta® at 50%. It is to be noted that in one embodiment, the amount of thread resources allocated to each tenant changes as the function of the number of competitor tenants and the relative weight of each competitor tenant changes over time.

It is contemplated that various message types may be associated with the tenants, such as DASHBOARD and APEX_FUTURE, where the three tenants may be weighted as follows: Pepsi® at 1, Coke® at 2, and Fanta® at 3. Considering, for example, Pepsi® has DASHBOARD messages while Pepsi®, Coke®, and Fanta® all have APEX_FUTURE messages that are pending processing. For brevity and simplicity, assuming that all message types are created equal, such as in the aggregate, DASHBOARD messages receive the same thread time as APEX_FUTURE messages. In uniform resource allocation, the hierarchy is not considered and each message type and tenant combination is assigned the same fraction of resources, such as Pepsi®, DASHBOARD at 25% of thread resources and similarly, Pepsi®, APEX_FUTURE at 25% of thread resources, Coke®, APEX_FUTURE at 25% of thread resources, and Fanta®, APEX_FUTURE at 25% of thread resources.

In one embodiment, hierarchical mechanism 110 offers a hierarchical allocation of resources even when message types come into consideration along with tenants to continue to ensure fair allocation and usage of resources by message types and/or tenants. For example, when distributed over a two-level hierarchy, such as first across competing message types and then across competing tenants within the message type, the distribution of resources may appear as follows: at top, such as message types, DASHBOARD may get 50% of thread resources, and APEX_FUTURE may also get 50% of thread resources. Since both message types carry the same importance as evaluated and selected by evaluation/selection logic 217, both message types are assigned the same weight, such as 1:1, by weight logic 221 and equally allocated their resources, such as 50%-50%, by resource logic 223.

Next, for example and in one embodiment, these resources assigned to the message types may be further divided among competing tenants within APEX_FUTURE (since this message type is shared by all three tenants in our example) according to the three tenants' correspondingly assigned weights as determined by evaluation/selection logic 217 and assigned by weight logic 221, as previously mentioned, such as Pepsi® at 16.7%, Coke® at 33.3%, and Fanta® at 50%. In one embodiment, using this breakdown of weights assigned to the three tenants, resource logic 223 may then allocate the tenants their corresponding thread resources for each message type, such as Pepsi®, DASHBOARD at 50%, Pepsi®, APEX_FUTURE at 8.35%, Coke®, APEX_FUTURE at 16.65%, and Fanta®, APEX_FUTURE at 25%. Stated differently, Pepsi® receives its entire share of resources allocated to DASHBOARD which, in this example, is 50% since only Pepsi® has DASHBOARD. However, given that APEX_FUTURE is shared by all three tenants in this example, Pepsi®, APEX_FUTURE receives only 16.7% of 50% of the resources, which translates into 8.35% of the overall thread resources. Similarly, Coke®, APEX_FUTURE receives 16.65% and Fanta®, APEX_FUTURE receives 25% of the total global thread resources.

To continue with the example, suppose Pepsi® no longer has APEX_FUTURE type of messages to process, this change may be detected by detecting/monitoring logic 213, monitored by fair usage module 215 to ensure that fair allocation of thread resources is ensured, evaluated by evaluation/selection logic 217 and accordingly, any weight allocation may be changed (as necessary) by weight logic 221 and the allocation of thread resources may be adjusted and reallocated by resource logic 223. In one embodiment, as illustrated with respect to resource utilization aggregator 303 of FIG. 3A, aggregating and fetching logic 219 may be used to fetch queuing time for each message type and tenant and may share the collected information with one or more components of hierarchical allocation engine 211, such as evaluation/selection logic 217 for further evaluation, weight logic 221 for weight assignment, fair usage module 215 to determine continuing fair usage of resources, etc. Referring back to Pepsi® no longer having APEX_FUTURE type messages to process, the composition may change to Pepsi®, DASHBOARD at 50%, Coke®, APEX_FUTURE at 20%, and Fanta®, APEX_FUTURE at 30% as facilitated by resource logic 223.

It is to be noted that in one embodiment, the resources freed by Pepsi are then redistributed among tenants under APEX_FUTURE to ensure that APEX_FUTURE messages continue to receive the same fraction of total resources as DASHBOARD messages. Similarly, for example, if DASHBOARD no longer has any messages, then the entire share of thread resources may be redistributed to APEX_FUTURE (e.g., resource logic 223 is work conserving).

It is contemplated that often, whether a tenant has messages to process is not a binary decision, such as Pepsi® may have fewer APEX_FUTURE messages than the available thread capacity for a given time period. In this case, Pepsi®'s weight may be adjusted accordingly to match the amount of thread resources that it may consume maximally. For example, assuming a factor of 1.0 denotes that a tenant has enough work to consume available thread resources in its entirety for the next time period (also referred to as "work consumption factor"), let Pepsi® have enough work to consume 50% of available capacity, then the work consumption for the three tenants with respect to APEX_FUTURE may be as follows: Pepsi® at 0.5, Coke® at 1.0, and Fanta® at 1.0.

Similarly, the weight assigned to each tenant may be adjusted by weight logic 221 which essentially translates into a reduction in Pepsi®'s weight based on its actual resource needs as opposed to the maximal share of the capacity, such as Pepsi® at 1*0.5=0.5, Coke® at 2*1.0=2, and Fanta® at 3*1.0=3. Given this adjusted weight, the redistribution portion of Pepsi®'s thread resources with respect to Coke® and Fanta® may appear as follows: Pepsi®, DASHBOARD at 50% of total thread resources, Pepsi®, APEX_FUTURE at 4.5% of total thread resources, Coke®, APEX_FUTURE at 18.2% of total thread resources, and Fanta®, APEX_FUTURE at 27.3% of total thread resources.

In one embodiment, evaluation/selection logic 217 may be used to perform various evaluation and computation tasks to accurately lead to determination of weight and how they may be seeded along with whether a tenant and/or a message type has jobs to process, etc. For example, upon performing various computations, weight logic 221 may offer an interface (e.g., Queue WeightScaling) to assign and seed the weight and determine the actual fraction of resources that is to be allocated based on the assigned weight to each tenant and/or message type. Similarly, upon knowing the weight and the corresponding fraction of resources that is to be allocated, resource logic 223 may then allocate the fraction to the tenant and/or message type according to their assigned weight. It is contemplated that any number and type of interface may be provided and that embodiments are not limited to any particular interface or form of interface, such as UniformQueue WeightScaling may be used for providing uniform allocation of resources, while HierarchicalOrgAwareQueue WeightScaling may be used for providing hierarchical allocation of resources according to one embodiment.

In one embodiment, the initial weights associated with tenants and/or message types may be the same; however, fair usage module 215 may monitor various, often dynamically changing, business policies or policy rules associated with the tenants and/or message types so that the resources may be fairly allocated. Accordingly, for example and in one embodiment, based on such business policies, the initial weights may be altered as computed by evaluation/selection logic 217 and seeded or assigned by weight logic 221. In one embodiment, these business policies may be stored in one or more configuration files at database(s) 140. Further, for example and in one embodiment, shared queues for message types may also be supported and as such, the highest weighted message type may be used to determine the weight for the shared queues.

Similarly, in one embodiment, those tenants that are not detected or identified offending/misbehaving tenants or victim/starving tenants by detecting/monitoring logic 213, such tenants are regarded as having lower traffic (e.g., needing fewer threads) and may share the same queue within a message type. For purposes of resource allocation, these shared tenant queues are regarded as a single logical tenant with a single assigned weight, such as 1. For example, with regard to DASHBOARD message type, Pepsi®, DASHBOARD may be assigned weight 1, Coke®, DASHBOARD may be assigned weight 2, and Shared Tenants, DASHBOARD may be assigned weight 1 (being treated as a single logical tenant) and accordingly, resource distribution may be as follows: Pepsi®, DASHBOARD at 25% of resources, Coke®, DASHBOARD at 50% of resources, and Shared Tenants, DASHBOARD at 25% of resources.

In some embodiments, to determine whether a tenant, a message type, or a combination thereof has any messages to process (such as to determine whether any resources are to be redistributed among other tenants), reliance is placed on queuing time measurements (e.g., time spent by messages waiting on a queue, etc.) which are collected from metering on a per-tenant or a per-message type basis as facilitated by aggregating and fetching logic 219. For example, using the previous example, if Pepsi® has a queuing time equally zero, it may then be considered as having no messages and as such, its resources may be redistributed as follows: Coke®, DASHBOARD at 66% of resources, and Shared Tenants, DASHBOARD at 33% of resources.

It is contemplated that in an actual or real-life multi-tenant environment, hierarchical mechanism 110 may regard queuing times in a more nuanced manner (e.g., it may not be just an all or nothing decision); for example, queuing time may be used to approximate work consumption factor described above to adjust the weight of a tenant. Thus, for example, if the queuing time for Pepsi® is less than that of Coke®, then Pepsi®'s weight may be adjusted downwards accordingly to allow for redistribution of thread resources to other tenants, as necessitated. In one embodiment, queuing time may be used as an approximation of the amount of pending messages (e.g., work) from Pepsi®, where the approximation may be used if querying a precise number of messages on the queue may be expensive or inefficient to perform on the system and further, the queuing time may be a reliable predictor of pending messages.

Figure 3A:
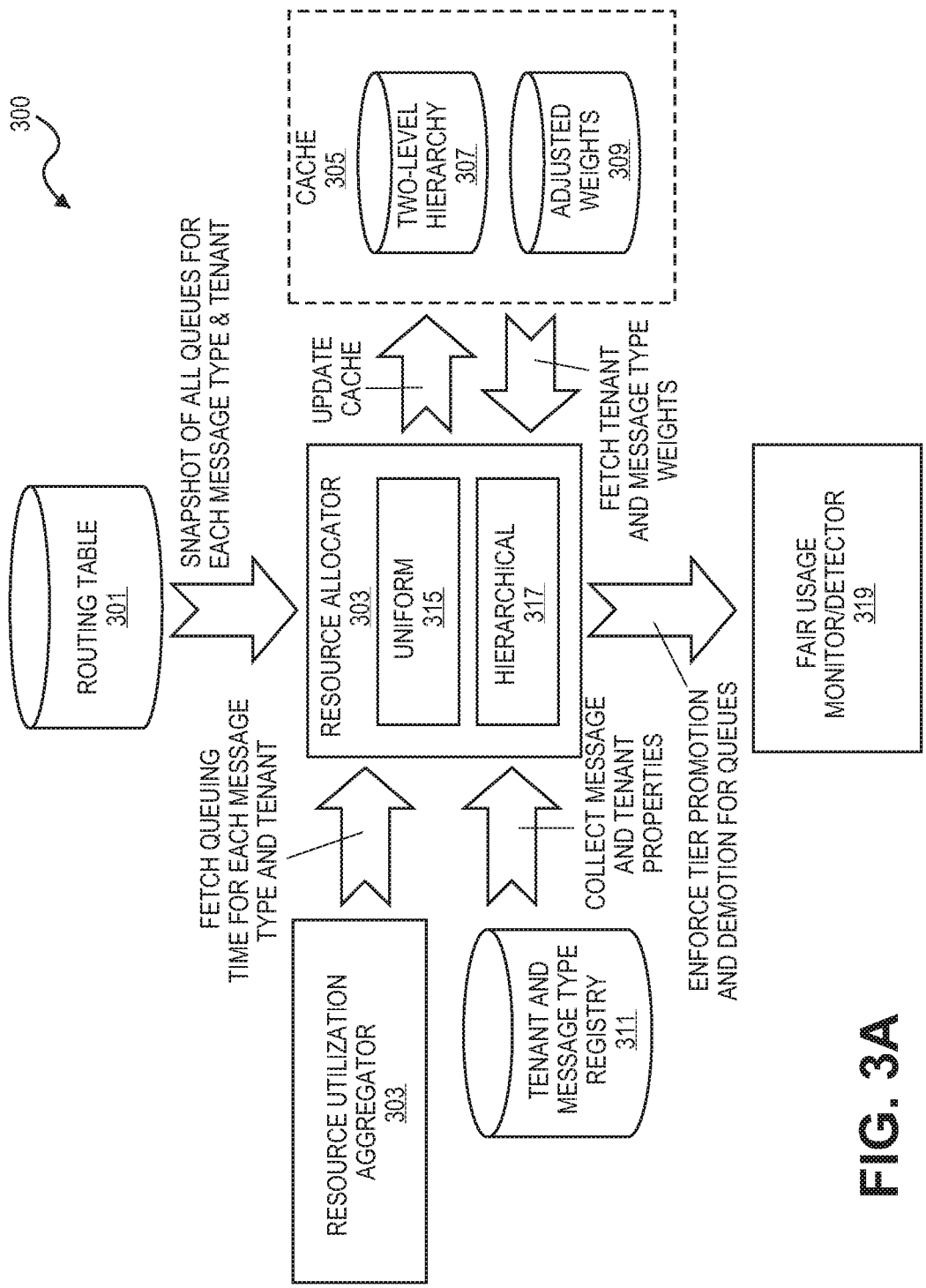
FIG. 3A illustrates a transaction sequence for dynamic hierarchical management of queue resources according to one embodiment.

Further, in one embodiment, database(s) 140 may include any number and type of tables and cache, such as routing table 301, tenant and message type registry 311, and cache 305 including two-level hierarchy cache 307 and adjusted weights cache 309, etc., as illustrated and will be further discussed with respect to FIG. 3A. In one embodiment, discovery of hierarchy may be performed via detecting and monitoring logic 213 which may loop through each queue and/or each message type and tenant combination which may then be used by evaluation/selection logic 217 to determine weight scaling factors.

Further, aggregating and fetching logic 219 may be used to group the tenants relating to the same message type together under the same hierarchy for, for example, indexing and efficient look up using one or more of the aforementioned tables and cache at database(s) 140. For example, and in one embodiment, caching of message type hierarchy may be performed to maintain a cache of the sum of weights of, for example, all those tenants having a non-zero queuing time within the same message type. This sum may be used to determine a number of competing tenants with messages to process and their corresponding weights. This caching may refer to and used as an optimization to avoid computing the sum when querying the resource allocation for each message type, tenant, and/or a combination thereof.

In one embodiment, evaluation/selection logic 217 may be used for resource fraction computation via an interface, such as allowing for querying the fraction of resources allocated to each message type, tenant, and/or a combination thereof. For example, and in one embodiment, to compute, a fraction of resource assigned to each message type in question is determined, where this fraction is denoted by M (e.g., via an interface, such as getScalingFactorForMessageType, etc.). Next, the weight of the tenant in question may be fetched via aggregating and fetching logic 219 (e.g., via an interface, such as getScalingFactorForOrg, etc.), where the weight may be referred to as O and is adjusted by queuing time. If, for example, the tenant has queuing time, T, then the adjusted weight may be computed by evaluation/selection logic 217 as O*T. Then, a sum of the adjusted weight, S, of all those tenants with messages to process or non-zero queuing time may be obtained and grouped under the message type in question. The fraction of the resources assigned to a specific message type, tenant, or a combination thereof, may then be computed as M*O*T/S.

Communication/compatibility logic 207 may facilitate the ability to dynamically communicate and stay configured with any number and type of software/application developing tools, models, data processing servers, database platforms and architectures, programming languages and their corresponding platforms, etc., while ensuring compatibility with changing technologies, parameters, protocols, standards, etc.

It is contemplated that any number and type of components may be added to and/or removed from hierarchical mechanism 110 to facilitate various embodiments including adding, removing, and/or enhancing certain features. It is contemplated that embodiments are not limited to any particular technology, topology, system, architecture, and/or standard and are dynamic enough to adopt and adapt to any future changes.

FIG. 3A illustrates a transaction sequence 300 for dynamic hierarchical management of queue resources according to one embodiment. Transaction sequence 300 may be performed by processing logic that may comprise hardware (e.g., circuitry, dedicated logic, programmable logic, etc.), software (such as instructions run on a processing device), or a combination thereof. In one embodiment, transaction sequence 300 may be performed or facilitated by hierarchical mechanism 110 of FIGS. 1-2. The processes of transaction sequence 300 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

In one embodiment, transaction sequence 300 is shown to employ one or more tables and/or cache components which may part of database(s) 140 of FIG. 2. For example, and in one embodiment, tables and/or cache components may include (without limitation) routing table 301, tenant and message type registry 311, and cache 305 including two-level hierarchy cache 307 and adjusted weights cache 309. In one embodiment, as illustrated, routing table 301 may hold any amount and type of data relating to queues, tenants, message types, etc., and may be used to provide, from within routing table 301, any snapshots of queues for each message type and/or tenant and/or a combination thereof to resource allocator 313 being facilitated by resource allocation logic 223 of FIG. 2.

Similarly, in one embodiment, tenant and message type registry 311 may hold any amount and type of data relating to queues, tenants, message types, etc., such as business policies (and/or business policy rules) and/or any credentials relating to each queue, tenant, and message type, etc., may be registered for identification of their priorities, importance, etc., and fetching and/or other purposes. In one embodiment, tenant and message type registry 311 may be used to fetch or collect priorities relating to message types and/or tenants and/or a combination thereof and forward that information on to resource allocator 313. In one embodiment, resource utilization aggregator 303, as facilitated by aggregating and fetching logic 219, may be used for fetch queuing time for each message type and/or tenant and/or a combination thereof and forwarding that information on to resource locator 313.

At resource locator 313, a determination may be made as to whether thread resources are to be allocated based on a uniform manner or in a hierarchical manner. As aforementioned, in some embodiments, thread resources are allocated in a uniform manner using uniform allocator 315 of resource allocator 313. However, as described throughout this document, in some embodiments, thread resources may be allocated based on a multi-level hierarchical manner (such as based on a two-level hierarchy, as discussed throughout this document) via hierarchy allocator 317 as facilitated by various components of hierarchical allocation engine 211.

As illustrated, resource allocator 313 may be further in communication with cache 315 in communicating any amount and type of information, such as resource allocator 313 may provide updated list of message types and/or tenants to cache 315 to be stored at two-level hierarchy cache 307. It is contemplated and as previously noted, embodiments are not limited to merely two-levels of hierarchy and thus, two-level hierarchy cache 307 is provided as an example for consistency, brevity, and clarity, and that it may be a multi-level hierarchy having any number and type of levels to support a multi-level hierarchical allocation of resources. Further, in one embodiment, resource allocator 313 may be further in communication with cache 315 to receive weights and any data relating to the weights associated with tenants and/or message types and/or a combination thereof, as facilitated by weight assignment logic 221, as fetched from adjusted weights cache 309 and provided on to resource allocator 313. In one embodiment, resource allocator 313 is further in communication with fair usage monitor 317, as facilitated by fair usage monitoring module 215, to enforce tier promotion and/or demotion for queues and to ensure and maintain a fair allocation and use of thread resources between tenants, message types, and a combination thereof, throughout the multi-tenant system.

FIG. 3B illustrates a transaction sequence 350 for constructing a multi-level (e.g., two-level) hierarchy for dynamic hierarchical management of queue resources according to one embodiment. Transaction sequence 350 may be performed by processing logic that may comprise hardware (e.g., circuitry, dedicated logic, programmable logic, etc.), software (such as instructions run on a processing device), or a combination thereof. In one embodiment, transaction sequence 350 may be performed or facilitated by hierarchical mechanism 110 of FIGS. 1-2. The processes of transaction sequence 350 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

As illustrated, in one embodiment, transaction sequence 350 includes a number of components, such as routing table 301, resource allocator 313, and two-level hierarchy cache 307, in communication with each other. Transaction sequence 350 begins at routing table 301 with collecting a list of message type level routing rules 351 is collected and communicated with resource allocator 313, where a node is created that sub-divides the message type into a tenant-level hierarchy 353 and communicated on to two-level hierarchy cache 307. Similarly, any weight scaling factor for the message type and the node is communicated to and stored 355 at two-level hierarchy cache 307. Further, in one embodiment, at resource allocator 313, the aforementioned processes may be repeated for each message type level rule 357.

Similarly, as with message types, in one embodiment, a list of tenant level routing rules is collected 359 and communicated on to resource allocator 313 which fetches the tenant level hierarchy for the corresponding message type 361 to two-level hierarchy cache 307. At resource allocator 313, a tenant is added to the hierarchy along with a weight scaling factor for the tenant 363. Any tenant level hierarchy for the message type is updated 367 and communicated on to two-level hierarchy cache 307 and, in some embodiments, the aforementioned processes may be repeated for each tenant level routing rule at resource allocator 313.

Figure 4:
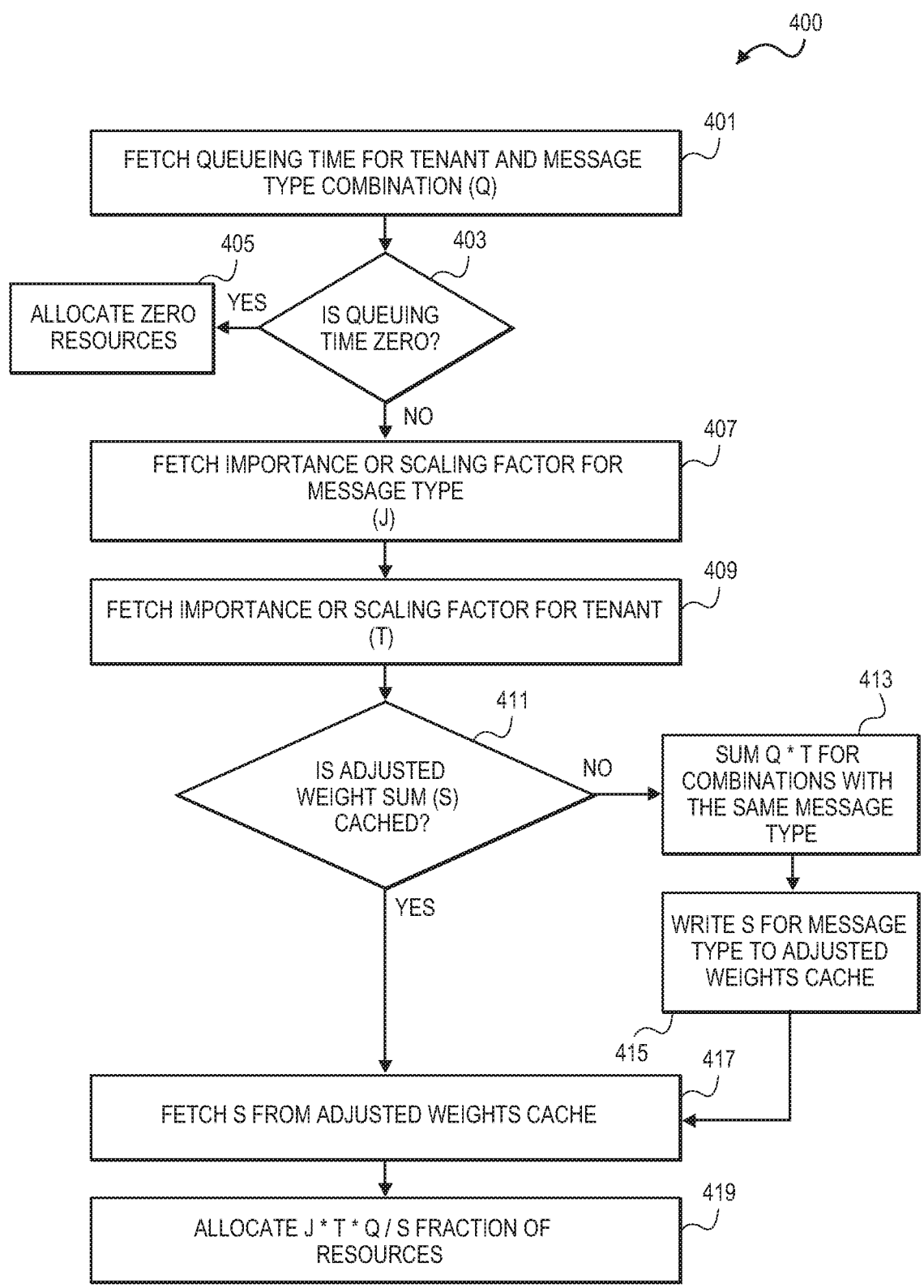
FIG. 4 illustrates a method for hierarchical allocation of queue resources for tenants and/or message types and/or a combination thereof for dynamic hierarchical management of queue resources according to one embodiment.

FIG. 4 illustrates a method 400 for hierarchical allocation of queue resources for tenants and/or message types and/or a combination thereof for dynamic hierarchical management of queue resources according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed or facilitated by hierarchical mechanism 110 of FIGS. 1-2. The processes of method 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

Method 400 may begin at block 401 with fetching queuing time for one or more tenants, message types, and/or a combination thereof. At block 403, a determination is made as to whether any of the tenants and/or message types in queues has zero queuing time and no messages to process. If yes, at block 405, such tenants and/or message types are allocated zero resources since they do not appear to need any resources as evident from their zero queuing time. If, however, there is a tenant and/or message type that is detected to be involved in message processing needing resources, any available and relevant business policies and/or weight assignments may be accessed to determine and fetch importance levels and/or scaling factors associated with the detected message type (J) at block 407. Similarly, at block 409, in one embodiment, the importance level and/or scaling factor for the detected tenant (T) is fetched.

At block 411, a determination is made as to whether the adjusted weight sum (S) is cached. If not, a sum (Q*T) for combinations (of tenants) with the same message type is performed at block 413. The process may then continue at block 415 with writing S for the message type to the adjusted weights cache, such as adjusted weights cache 309 of FIGS. 3A-3B. Upon writing S, as in block 415, or, referring to block 411, if the adjusted weight sum (S) is cached, S is fetched from adjusted weights cache at block 417. At block 419, a fraction (J*T*Q/S) of the resources is allocated to the tenant and/or message type and/or a combination thereof at block 419.

Figure 5:
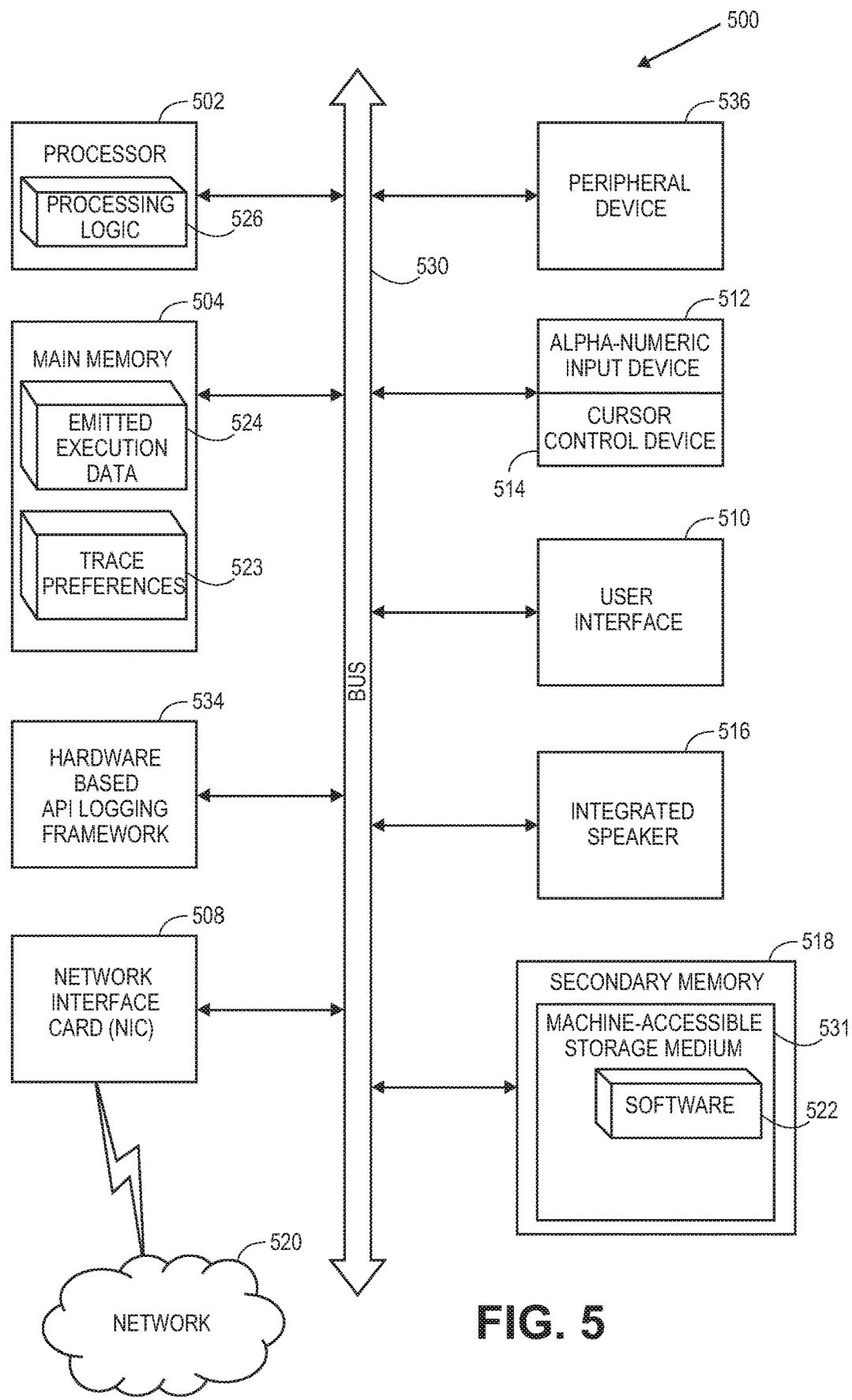
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing devices 120, 130A-N of FIG. 1. In alternative embodiments, the machine may be connected (e.g., networked) to other machines in a network (such as host machine 120 connected with client machines 130A-N over network 135 of FIG. 1), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of hierarchical mechanism 110 as described with reference to FIG. 1 other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of hierarchical mechanism 110 as described with reference to FIG. 1, respectively, and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
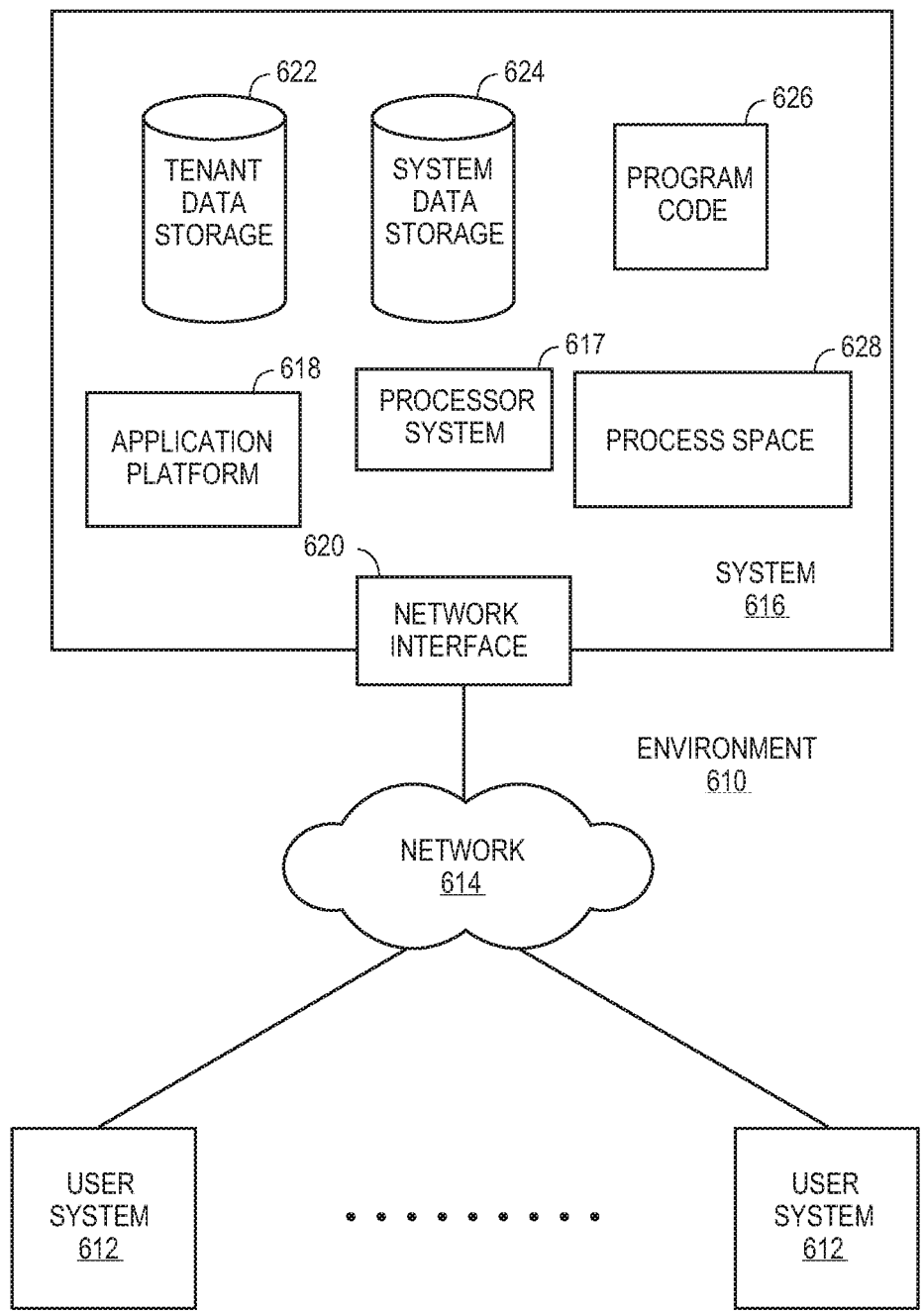
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
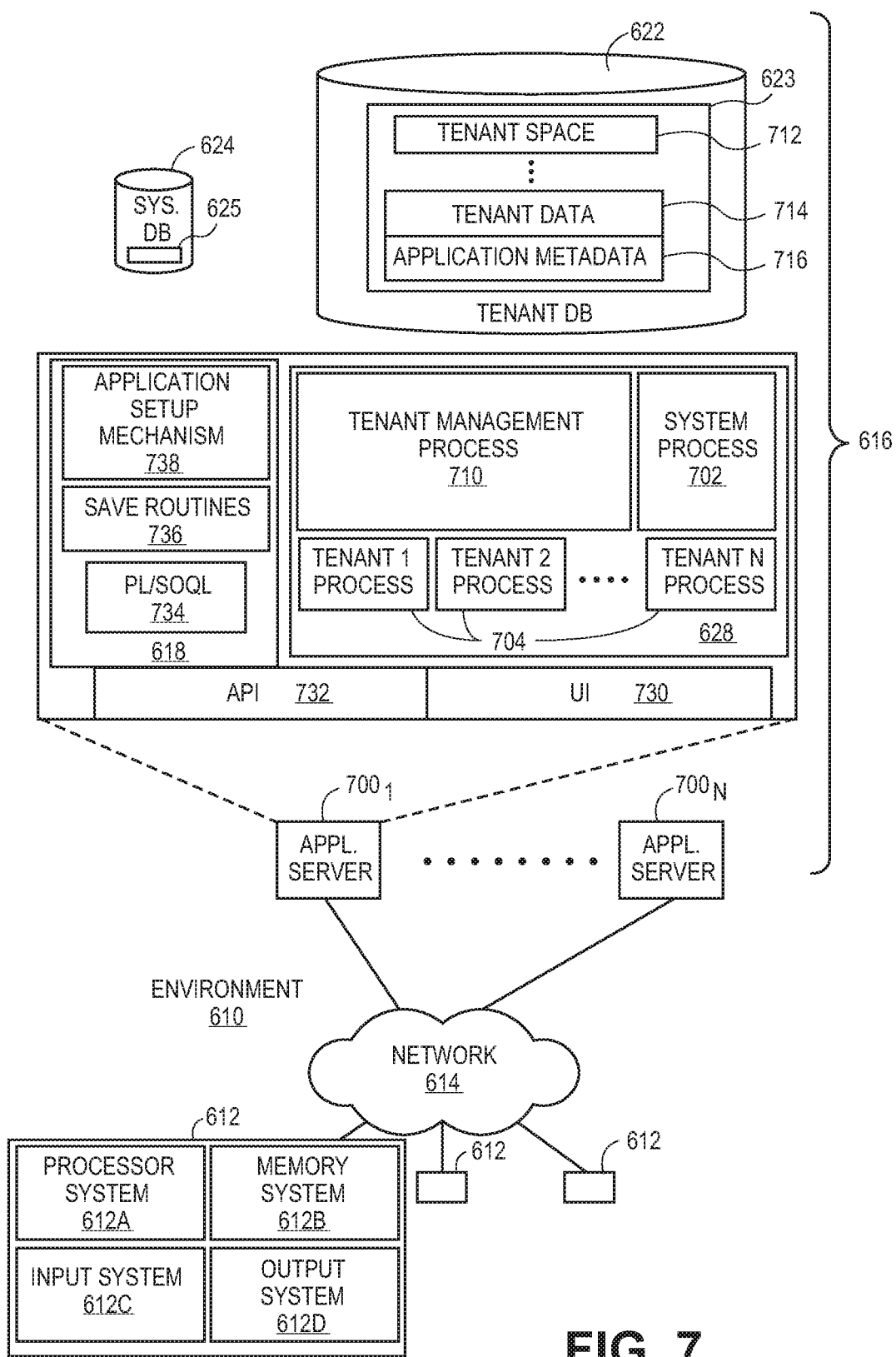
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A method comprising:
fetching message type properties and tenant properties associated with message types and tenants, respectively;
fetching message type queuing time and tenant queuing time associated with the message types and the tenants, respectively, wherein the message type and tenant queuing times are based on the message type and tenant properties;
determining real-time snapshots of queues available to be assigned to the message types and the tenants;
assigning scaling factors to the message types and the tenants based on the message type and tenant queuing times and the real-time snapshots;
forming one or more combinations of one or more of the message types with one or more of the tenants based on the assigned scaling factors; and
allocating resources associated with the queues to the one or more combinations, wherein allocating includes promoting or demoting the one or more combinations between two or more of the queues.

2. The method of claim 1, further comprising allocating zero resources to one or more zero resource-consuming tenants and one or more zero resource-consuming message types that are determined as using zero amount of the tenant queuing time and the message type queuing time, respectively.

3. The method of claim 1, wherein fetching further comprises retrieving weights from a weights cache, wherein the weights to identify one or more dimensions corresponding to the tenants or the message types, wherein the one or more dimensions include one or more of priority levels and process urgency levels associated with the tenants and the message types.

4. The method of claim 1, further comprising:
monitoring resource consumption levels associated with the tenants and the message types, wherein the resource consumption levels are monitored to ensure fair usage of the resources by one or more of the tenants and the message types based on the assigned weights; and
computing the weights prior to assigning the weights to one or more of the tenants and the message types.

5. A database system having a server computing device coupled to a database, the server computing to facilitate operations comprising:
fetching message type properties and tenant properties associated with message types and tenants, respectively;
fetching message type queuing time and tenant queuing time associated with the message types and the tenants, respectively, wherein the message type and tenant queuing times are based on the message type and tenant properties;
determining real-time snapshots of queues available to be assigned to the message types and the tenants;
assigning scaling factors to the message types and the tenants based on the message type and tenant queuing times and the real-time snapshots;
forming one or more combinations of one or more of the message types with one or more of the tenants based on the assigned scaling factors; and
allocating resources associated with the queues to the one or more combinations, wherein allocating includes promoting or demoting the one or more combinations between two or more of the queues.

6. The database system of claim 5, wherein the operations further comprise allocating zero resources to one or more zero resource-consuming tenants and one or more zero resource-consuming message types that are determined as using zero amount of the tenant queuing time and the message type queuing time, respectively.

7. The database system of claim 5, wherein fetching further comprises retrieving weights from a weights cache, wherein the weights to identify one or more dimensions corresponding to the tenants or the message types, wherein the one or more dimensions include one or more of priority levels and process urgency levels associated with the tenants and the message types.

8. The database system of claim 5, wherein the operations further comprise:
monitoring resource consumption levels associated with the tenants and the message types, wherein the resource consumption levels are monitored to ensure fair usage of the resources by one or more of the tenants and the message types based on the assigned weights; and
computing the weights prior to assigning the weights to one or more of the tenants and the message types.

9. A non-transitory computer-readable medium having stored thereon instructions which, when executed by a computing device, cause the computing device to facilitate operations comprising:
fetching message type properties and tenant properties associated with message types and tenants, respectively;
fetching message type queuing time and tenant queuing time associated with the message types and the tenants, respectively, wherein the message type and tenant queuing times are based on the message type and tenant properties;
determining real-time snapshots of queues available to be assigned to the message types and the tenants;
assigning scaling factors to the message types and the tenants based on the message type and tenant queuing times and the real-time snapshots;
forming one or more combinations of one or more of the message types with one or more of the tenants based on the assigned scaling factors; and
allocating resources associated with the queues to the one or more combinations, wherein allocating includes promoting or demoting the one or more combinations between two or more of the queues.

10. The non-transitory computer-readable medium of claim 9, wherein the operations further comprise allocating zero resources to one or more zero resource-consuming tenants and one or more zero resource-consuming message types that are determined as using zero amount of the tenant queuing time and the message type queuing time, respectively.

11. The non-transitory computer-readable medium of claim 9, wherein fetching further comprises retrieving weights from a weights cache, wherein the weights to identify one or more dimensions corresponding to the tenants or the message types, wherein the one or more dimensions include one or more of priority levels and process urgency levels associated with the tenants and the message types.

12. The non-transitory computer-readable medium of claim 9, wherein the operations further comprise:
monitoring resource consumption levels associated with the tenants and the message types, wherein the resource consumption levels are monitored to ensure fair usage of the resources by one or more of the tenants and the message types based on the assigned weights; and
computing the weights prior to assigning the weights to one or more of the tenants and the message types.

* * * * *